United States Patent [19]

Gregory et al.

[11] Patent Number: 5,820,661
[45] Date of Patent: Oct. 13, 1998

[54] INK COMPOSITIONS CONTAINING DISAZO DYES

[75] Inventors: Peter Gregory, Bolton; Mark Kenworthy, Audenshaw; Andrew Hunter Morris Renfrew, Greenmount, all of United Kingdom

[73] Assignee: Zeneca Limited, London, England

[21] Appl. No.: 831,938

[22] Filed: Apr. 2, 1997

[30] Foreign Application Priority Data

Apr. 25, 1996 [GB] United Kingdom ............... 9608485

[51] Int. Cl.$^6$ ................................... C09D 11/02
[52] U.S. Cl. .................................. 106/31.48; 106/31.57; 427/466; 428/195; 430/106
[58] Field of Search .............. 106/31.48, 31.57; 534/797; 427/466; 428/195; 430/106

[56] References Cited

U.S. PATENT DOCUMENTS

| 5,183,501 | 2/1993 | Kawashita et al. | 106/31.48 |
| 5,466,282 | 11/1995 | Eida et al. | 106/31.48 |
| 5,667,571 | 9/1997 | Ono et al. | 106/31.48 |

FOREIGN PATENT DOCUMENTS 3-091576  4/1991  Japan .

*Primary Examiner*—Helene Klemanski
*Attorney, Agent, or Firm*—Pillsbury Madison & Sutro, LLP

[57] ABSTRACT

An ink composition comprising:
(i) a dye of Formula (1) or a salt thereof:

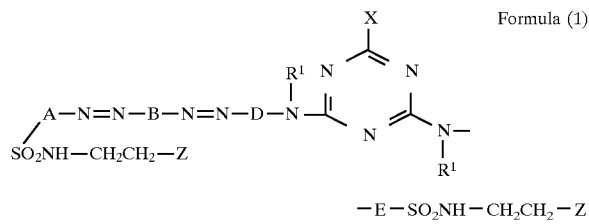

wherein:
- A is optionally substituted phenylene;
- B and E each independently is optionally substituted phenylene or optionally substituted naphthylene;
- D is a coupling component;
- each $R^1$ independently is H or optionally substituted alkyl;
- X is a labile or non-labile atom or group;
- each Z independently is $-OR^3$, $-SR^3$, $-NR^4R^5$ or $-Y-SO_3H$ in which Y is O or S; and
- $R^3$, $R^4$ and $R^5$ each independently is H, optionally substituted alkyl, optionally substituted alkenyl, cycloalkyl, optionally substituted aralkyl, optionally substituted aryl or $R^4$ or $R^5$ together with the nitrogen atom to which they are attached form a 5 or 6 membered ring; and (ii) a medium comprising a low melting point solid, an organic solvent, or a mixture of water and one or more water-soluble organic solvent(s).

Also claimed is a process for ink jet printing using the inks, a process for ink jet printing of textiles using the inks and a toner containing a dye with at least one group of Formula (1).

11 Claims, No Drawings

INK COMPOSITIONS CONTAINING DISAZO DYES

The present invention relates to compositions and solutions thereof, suitable for use in printing and imaging technologies, especially those suitable for coloration of substrates such as paper, plastics, textiles, metal and glass by printing processes such as ink jet printing and those suitable for use in electrophotography such as toners.

Ink jet printing is a non-impact printing technique which involves ejecting, thermally or by action of an oscillating piezo crystal, droplets of ink continuously or on demand from a fine nozzle directly onto a substrate such as paper, plastics, textile, metal or glass. The ink may be aqueous, solvent or hot melt based and must provide sharp, non-feathered images which have good waterfastness, light fastness and optical density, have fast fixation to the substrate and cause no clogging of the nozzle.

Electrophotographic copiers or printers generally comprise an organic photoconductor (OPC) and a developer or toner. The OPC generally comprises an electrically conducting support, a charge generating layer and a charge transport layer. The electrically conducting support is a metal drum, typically an aluminium drum, or a metallised polymer film, typically aluminised polyester. The charge generating layer comprises a charge generating material (CGM) and a binder resin, typically a polycarbonate. The charge transport later comprises a charge transport material (CTM) and a binder resin, typically a polycarbonate. The developer or toner comprises a toner resin, a colorant and optionally a charge control agent (CCA). The toner resin is typically a styrene or substituted styrene polymer or styrene-butadiene copolymer. The colorant is typically a dye or pigment or mixture thereof.

According to the present invention there is provided an ink composition comprising:

(i) a dye of Formula (1) or a salt thereof:

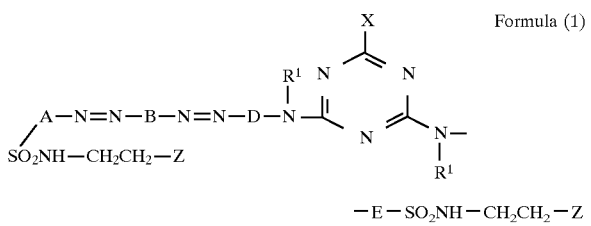

Formula (1)

wherein:
- A is optionally substituted phenylene;
- B and E each independently is optionally substituted phenylene or optionally substituted naphthylene;
- D is a coupling component;
- each $R^1$ independently is H or optionally substituted alkyl;
- X is a labile or non-labile atom or group; and
- each Z independently is $-OR^3$, $-SR^3$, $-NR^4R^5$ or $-Y-SO_3H$ wherein
- Y is O or S;
- $R^3$, $R^4$ and $R^5$ each independently is H, optionally substituted alkyl, optionally substituted alkenyl, cycloalkyl, optionally substituted aralkyl, optionally substituted aryl or $R^4$ and $R^5$ together with the nitrogen atom to which they are attached form a 5 or 6 membered ring; and (ii) a medium comprising at least one of a low melting point solid, an organic solvent, or a mixture of water and one or more water-soluble organic solvent(s).

The dye of Formula (1) may be in an unionised or free acid form as shown, but is preferably in the form of a salt with one or more cations. Prefered cations are selected from an alkali metal, ammonium and optionally substituted $C_{1-4}$-alkylammonium cations. Preferred alkali metal cations include lithium, sodium and potassium. A preferred $C_{1-4}$-alkylammonium cation consists of a nitrogen atom having four substituents selected from H, $C_{1-4}$-alkyl and hydroxy-$C_{1-4}$-alkyl, for example mono-, di-, tri- and tetra-($C_{1-4}$-alkyl)ammonium and mono-, di, tri- and tetra-(hydroxy$C_{1-4}$-alkyl)ammonium. It is preferred that the dye of Formula (1) is a salt with an $NH_4^+$ cation or a mono- or poly-, methyl- or ethylammonium cation or with a mixture of two or more cations, especially a mixture of alkali metal and optionally substituted ammonium cations. Examples of optionally substituted $C_{1-4}$-alkylammonium cations include mono-, di-, tri- and tetra-methylammonium, mono-, di-, tri- and tetra-ethylammonium and mono-, di-, tri- and tetra-(2-hydroxyethyl)ammonium.

The dye of Formula (1) may be converted wholly or partially into its ammonium or optionally substituted $C_{1-4}$-alkyl ammonium salt by dissolving in water the dye of Formula (1) in the form of a salt with an alkali metal, acidifying the solution with a mineral acid, such as hydrochloric acid, separating the precipitated compound in free acid form, suspending it in water, adjusting the pH of the suspension to 9 to 9.5 with ammonia or an optionally substituted $C_{1-4}$-alkylamine to form the water-soluble ammonium or $C_{1-4}$-alkylammonium salt and removing the alkali metal chloride ions by dialysis. Alternatively the alkali metal ion may be exchanged for an optionally substituted ammonium ion by a conventional ion exchange method.

Preferably the total number of sulpho groups in the dye of Formula (1) is from 2 to 6.

The optional substituents which may be present on A, B, D, E and $R^1$ are preferably each independently selected from $C_{1-4}$-alkyl, especially methyl; $C_{1-4}$-alkoxy, especially methoxy; halo, especially Cl; nitro; amino; hydroxy; sulpho; cyano; carboxy; ureido; and $C_{1-4}$-amido, especially acetamido.

A, B and E are preferably each independently optionally substituted 1,3- or 1,4-phenylene.

D is preferably optionally substituted naphthylene, more preferably optionally substituted 2,6-, 2,7- or 2,8-naphthylene, especially optionally substituted naphthylene having a hydroxy group at the 1-position of the naphthylene ring; optionally substituted phenylene, more preferably 1,3- or 1,4- phenylene; or an optionally substituted pyridonylene or pyrazolonylene group.

Each $R^1$ independently is preferably H or $C_{1-4}$-alkyl, especially H or methyl.

Each of $R^3$, $R^4$ and $R^5$ independently is preferably selected from H, $C_{1-10}$-alkyl especially $C_{1-4}$-alkyl, substituted $C_{1-10}$-alkyl especially substituted $C_{1-4}$-alkyl, phenyl, substituted phenyl, $(CH_2)_{1-4}$-phenyl and substituted $(CH_2)_{1-4}$-phenyl especially benzyl and substituted benzyl. When any one of $R^3$, $R^4$ or $R^5$ is substituted, the substituent is preferably selected from $-OH$, $-CH_3$, $-OCH_3$, $-SO_3H$ and $-CO_2H$. When $R^4$ and $R^5$ together with the nitrogen atom to which they are attached form a 5- or 6-membered ring, this is 1 preferably morpholine, piperidine or piperazine especially the latter in which the free ring N-atom may be, and preferably is substituted by a $C_{1-4}$-alkyl or hydroxy-$C_{2-4}$-alkyl group.

Preferred groups of the formula $-OR^3$, $-SR^3$ and $-NR^4R^5$ represented by Z include: OH; SH; alkoxy, such as methoxy or ethoxy; hydroxy-$C_{2-4}$-alkylamino, such as mono or di-(2-hydroxyethyl)amino; morpholinyl; piperidinyl; piperazinyl; 4-(hydroxy-$C_{2-4}$-alkyl)piperazin-1-yl, such as 4-hydroxyethylpiperazin-1-yl; 4-($C_{1-4}$-alkyl)piperazin-1-yl, such as 4-methylpiperazin-1-yl; $C_{1-6}$-alkylamino, such as dimethylamino, n-butylamino or n-hexylamino; carboxy-$C_{-1-4}$-alkylamino, such as 2-carboxymethylamino; arylamino, such as phenylamino, mono-3- or di-3,5-carboxyanilino; or aralkylamino, such as benzylamino, mono-3- or di-3,5-carboxyphenylmethylamino. Where Z is alkoxy it preferably contains from 1 to 4 carbon atoms.

It is especially preferred that Z is —$OSO_3H$.

By a labile atom or group it is meant an atom or group which is bound by a chemical bond to the triazine nucleus, which atom or group is displaceable by a hydroxyl group or cellulose under mildly alkaline aqueous conditions to form a covalent bond between the triazine nucleus and cellulose. As examples of such atoms or group represented by X there may be mentioned halogen atoms, for example F and Cl; sulphonic acid groups; thiocyano groups; quaternary ammonium groups, for example trialkylammonium groups and optionally substituted pyridinium groups, for example 3- and 4-carboxy pyridinium groups.

Preferred labile atoms and groups represented by X include a quaternary ammonium group or halo, more preferably 3- or 4-carboxypyridinium, F or Cl, especially Cl.

Preferred non-labile groups represented by X include —$OR^3$, —$SR^3$ or —$NR^4R^5$, wherein $R^3$, $R^4$ and $R^5$ each independently is as hereinbefore defined.

Preferred groups of the formulae —$OR^3$, —$SR^3$ and —$NR^4R^5$ represented by X are as hereinbefore defined for Z.

X is preferably a pyridinium group, especially 3- or 4-carboxy pyridinium; more preferably a halo atom, especially F or Cl, more especially Cl.

When X and Z represent a group of the formula —OR , —$SR^3$ or —$NR^4R^5$, it is preferred that Z and X are the same. For example both X and Z are —OH or both are —NH ($C_2H_4OH$).

A preferred class of ink compositions according to the invention comprises:

(i) a dye of the Formula (2) or a salt thereof:

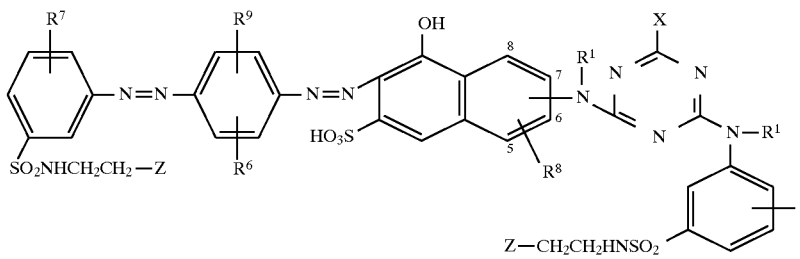

wherein:

$R^6$ and $R^9$ are each independently H, $SO_3H$, $C_{1-4}$-alkyl, $C_{1-4}$-alkoxy or halo;

each $R^7$ independently is H, $SO_3H$, $C_{1-4}$-alkoxy, $C_{1-4}$-alkyl or halo;

$R^8$ is H or $SO_3H$;

$R^1$, X and Z are as hereinbefore defined; and (ii) a medium comprising a low melting point solid, an organic solvent, or a mixture of water and one or more water-soluble organic solvent(s).

In compounds of Formula (2) it is preferred that when the —$NR^1$— group is at the 6-position shown on the naphthalene ring then $R^8$ is H.

It is preferred that Z is a group of the formula —$YSO_3H$ wherein Y is O or S and that X is a labile atom or group in the compound of Formula (2).

In compounds of Formula (2) it is preferred that $R^6$ and $R^7$ each independently is H, $SO_3H$, methyl, methoxy or chloro.

Dyes of Formulae (1) and (2) wherein Z is —$YSO_3H$ may be prepared by condensing compounds of Formula (3) and (4) wherein A, B, D, E, $R^1$ and Y are as hereinbefore defined, and X is a labile atom or group:

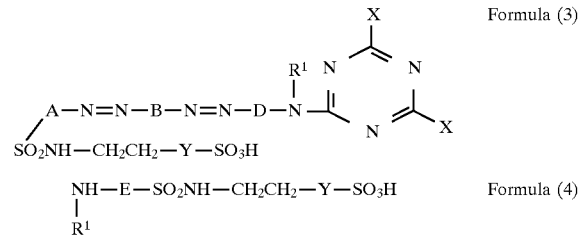

Preferably condensation of the compounds of Formula (3) and (4) is performed in an aqueous medium, especially water. The precise conditions will be chosen to prevent or limit side reactions such as hydrolysis of the dye. Generally a temperature in the range 0° C. to 50° C. is used. A pH of 5 to 7, preferably 6 to 6.5, is convenient for the condensation.

Compounds of Formula (4) are known in the literature.

Compounds of Formula (3) can be prepared by diazotising and coupling $H_2N$—B—N=N—A—$SO_2NH$—$CH_2CH_2$—Y—$SO_3H$ onto H—D—$NR^1$-s-triazine(—$X)_2$ wherein B, A, Y, $R^1$ and D are as hereinbefore defined and X is a labile atom or group. Preparation of the necessary intermediates is illustrated in the Examples and analogous compounds may be prepared by experienced dyestuff chemists without difficulty.

Diazotisation conditions are well known in the art, for example treating an amine with $NaNO_2$ under acidic conditions at 0°–5° C.

When Z is —$OR^3$, —$SR^3$ or —$NR^4R^5$ in Formulae (1) or (2) the group Z is preferably introduced to the product of the above process via an addition reaction. It is preferred that the addition reaction is performed by adding a compound of the formula ZH to an alkaline solution of the condensation product of the compounds of formulae (3) and (4).

The compounds of Formula (1) can be isolated from the medium in which they have been prepared by conventional methods used for isolation of water-soluble dyes, e.g. by salting out followed by filtration and drying the reaction product. If desired, stabilisers such as alkali metal hydrogen phosphates, polyphosphates or diluents such as sodium chloride or urea can be added. The dyes may also be desalinated using techniques such as reverse osmosis and/or ultrafiltration to give formulations having high solubility in water.

Although compounds of Formula (1) and (2) have been shown in their free-acid form in this specification, it is intended that the formulae includes salts of the compounds, and in particular the alkali metal salts such as the sodium, potassium, lithium or mixed sodium/lithium salt.

The ink compositions of the present invention preferably contains from 0.5% to 20%, more preferably from 0.5% to 15%, and especially from 1% to 3%, by weight of the dye of Formula (1) based on the total weight of the ink. Although many ink compositions contain less than 5% by weight of dye, it is desirable that the dye has a solubility of around 10% or more to allow the preparation of concentrates which may be used to prepare more dilute inks and to minimise the chance of precipitation of dye if evaporation of the liquid medium occurs during storage of the ink. It is preferred that the dye of Formula (1) is dissolved completely in the medium.

Aqueous-based ink compositions are generally used in office or home printers whereas solvent based ink compositions find use in industrial continuous printers.

Where the liquid medium is a mixture of water and one or more water-soluble organic solvent(s), it is preferred that the weight ratio of water to organic solvent(s) is from 99:1 to 1:99, more preferably from 99:1 to 50:50 and especially from 95:5 to 80:20.

The water-soluble organic solvent(s) is preferably selected from $C_{1-4}$-alkanols, for example methanol, ethanol, n-propanol, isopropanol, n-butanol, sec-butanol, tert-butanol and isobutanol; cyclic alkanols, for example cyclohexanol and cyclopentanol; amides, for example dimethylformamide and dimethylacetamide; ketones or ketone-alcohols, for example acetone and diacetone alcohol; ethers, for example tetrahydrofuran and dioxane; oligo- or poly-alkyleneglycols, for example diethylene glycol, triethylene glycol, polyethylene glycol and polypropylene glycol; alkyleneglycols or thioglycols containing a $C_2$–$C_6$-alkylene group, for example ethylene glycol, propylene glycol, butylene glycol, pentylene glycol, hexylene glycol and thiodiglycol; polyols, for example glycerol and 1,2,6-hexanetriol; $C_{1-4}$-alkyl-ethers of polyhydric alcohols, for example 2-methoxyethanol, 2-(2-methoxyethoxy)ethanol, 2-(2-ethoxyethoxy)-ethanol, 2-[2-(2-methoxyethoxy)ethoxy] ethanol and 2-[2-(2-ethoxyethoxy)-ethoxy]-ethanol; heterocyclic ketones, for example 2-pyrrolidone and N-methyl-2-pyrrolidone; or mixtures containing two or more of the aforementioned water-soluble organic solvents, for example thiodiglycol and a second glycol or diethylene glycol and 2-pyrrolidone.

Preferred water-soluble organic solvents are 2-pyrrolidone; N-methyl-pyrrolidone; alkylene- and oligoalkylene-glycols, for example ethyleneglycol, diethyleneglycol and triethyleneglycol; and lower alkyl ethers of polyhydric alcohols such as or 2-methoxy-2-ethoxy-2-ethoxyethanol; and polyethyleneglycols with a molecular weight of up to 500. A preferred specific solvent mixture is a binary or ternary mixture of water and diethylene glycol and/or, 2-pyrrolidone or N-methylpyrrolidone in weight ratios 75–95:25–5 and 60–80:0–20:0–20 respectively.

Examples of suitable ink media are given in U.S. Pat. No. 4,963,189, U.S. Pat. No. 4,703,113, U.S. Pat. No. 4,626,284 and EP 4,251,50A.

Where the liquid medium is an organic solvent the solvent is preferably selected from ketones, alkanols, aliphatic hydrocarbons, esters, ethers, amides or mixtures thereof. Where an aliphatic hydrocarbon is used as the solvent a polar solvent such as an alcohol, ester, ether or amide is preferably added. Preferred solvents include ketones, especially methyl ethyl ketone and alkanols especially ethanol and n-propanol.

Organic solvent based ink compositions are used where fast drying times are required and particularly when printing onto hydrophobic substrates such as plastics, metal or glass.

When the medium for the ink composition is a low melting point solid the melting point of the solid is preferably in the range from 60° C. to 125° C. Suitable low melting point solids include long chain fatty acids or alcohols, preferably those with $C_{18-24}$ chains, or sulphonamides. The dye of Formula (1) may be dissolved in the low melting point solid or may be finely dispersed in it.

It is preferred that the medium is a liquid medium, more preferably a mixture of water and one or more water-soluble organic solvent(s).

The inks may optionally contain other components conventionally used in inks for ink jet printing. For example, viscosity and surface tension modifiers, corrosion inhibitors, kogation reducing additives, and surfactants which may be ionic or non ionic.

A particularly preferred ink composition comprises:
  (a) 0.5 to 20 parts of the dye of Formula (1) or (2);
  (b) 2 to 60 parts of water-soluble organic solvent(s); and
  (c) 1 to 95 parts water;
wherein all parts are parts by weight based on the total weight of the ink and the parts (a)+(b)+(c)=100.

In addition to the parts (a), (b) and (c) the ink may contain other additional components conventionally used in ink formulations as hereinbefore defined.

According to a second aspect of the present invention there is provided a process for printing a substrate with an ink composition using an ink jet printer, characterised in that the ink composition is as defined for the first aspect of the present invention.

A suitable process for the application of an ink composition as hereinbefore described comprises forming the ink into small droplets by ejection from a reservoir through a small orifice so that the droplets of ink are directed at a substrate. This process is commonly referred to as ink jet printing, and preferred ink jet printing processes for the present inks are piezoelectric ink jet printing and thermal ink jet printing. In thermal ink jet printing, programmed pulses of heat are applied to the ink in the reservoir by means of a resistor adjacent to the orifice, during relative movement between the substrate and the reservoir.

Preferred substrates include overhead projector slides, metals, plastics, glass or papers, including plain and treated papers, which may have an acid, alkaline or neutral character or textile materials such as cotton.

The preferred ink used in the process is as hereinbefore described.

According to a third aspect of the present invention there is provided a paper or an overhead projector slide or a textile material printed with an ink composition according to the first aspect of the present invention or by means of the process according to the second aspect of the present invention.

According to a fourth aspect of the present invention there is provided a process for the coloration of a textile material with an ink composition according to the first aspect of the present invention which comprises the steps:
  i) applying the ink composition to the textile material by ink jet printing; and
  ii) heating the textile material at a temperature from 50° C. to 250° C. to fix the dye on the material.

The process for coloration of a textile material by ink jet printing preferably comprises a pre-treatment of the textile material with an aqueous pretreatment composition comprising a water-soluble base, a hydrotropic agent and a thickening agent followed by removing water from the pre-treated textile material to give a dry pre-treated textile material which is subjected to ink jet printing in step i) above.

The pretreatment composition preferably comprises an solution of the base and the hydrotropic agent in water containing the thickening agent.

The base is preferably an inorganic alkaline base, especially a salt of an alkali metal with a weak acid such as an alkali metal carbonate, bicarbonate or silicate or an alkali metal hydroxide. The amount of base may be varied within wide limits provided sufficient base is retained on the textile material after pretreatment to promote the formation of a covalent bond between the dye and the pretreated textile material. Where the base is sodium bicarbonate it is convenient to use a concentration of from 1% to 5% by weight based on the total weight of the composition.

The hydrotropic agent is present to provide sufficient water to promote the fixation reaction between the dye and the textile material during the heat treatment, in step (ii) above, and any suitable hydrotropic agent may be employed. Preferred hydrotropic agents are urea, thiourea and dicyandiamide. The amount of hydrotropic agent depends to some extent on the type of heat treatment. If steam is used for the heat treatment generally less hydrotropic agent is required than if the heat treatment is dry, because the steam provides a humid environment. The amount of hydrotropic agent required is generally from 2.5% to 50% by weight of the total composition with from 2.5% to 10% being more suitable for a steam heat treatment and from 20% to 40% being more suitable for a dry heat treatment.

The thickening agent may be any thickening agent suitable for use in the preparation of print pastes for the conventional printing of cellulose reactive dyes. Suitable thickening agents include alginates, especially sodium alginate, xantham gums, monogalactam thickeners and cellulosic thickeners. The amount of the thickening agent can vary within wide limits depending on the relationship between concentration and viscosity. However, sufficient agent is preferred to give a viscosity from 10 to 1000 mPa.s, preferably from 10 to 100 mPa.s, (measured on a Brookfield RVF Viscometer). For an alginate thickener this range can be provided by using from 10% to 20% by weight based on the total weight of the pretreatment composition.

The remainder of the pretreatment composition is preferably water, but other ingredients may be added to aid fixation of the dye to the textile material or to enhance the clarity of print by inhibiting the diffusion (migration) of dye from coloured areas to non-coloured areas before fixation.

Examples of fixation enhancing agents are cationic polymers, such as a 50% aqueous solution of a dicyanamide/phenol formaldehyde/ammonium chloride condensate e.g. MATEXIL™ FC-PN (available from ICI), which have a strong affinity for the textile material and the dye, even a dye which is unreactive, and thus increase the fixation of the dye on the textile material.

Examples of anti-migration agents are low molecular weight acrylic resins, e.g. polyacrylates, such as poly(acrylic acid) and poly(vinyl acrylate).

Where the dye of Formula (1) contains a halotriazine reactive group, it has been found that the yield of dye fixed to the textile material can be improved by the addition to the pretreatment composition of certain tertiary amines which are capable of interacting with the reactive group so as to replace the halogen atom and form a quaternary nitrogen leaving group, corresponding to the tertiary amine, which is displaced during fixation reaction of the dye with the textile material. It is therefore a preferred feature of the present process that the pretreatment composition also contains such a tertiary amine. Any tertiary amine may be used, but a preferred tertiary amines are substantially odourless compounds such as 1,4-diazabicyclo[2.2.2]octane (DABCO) and susbtituted pyridines, preferably carboxypyridines, and especially those in which the pyridine ring is substituted by a carboxylic acid group in the 3 or 4 position, such as nicotinic or isonicotinic acid.

However, when further agents are added to the pretreatment composition, care must be taken to balance their effects and to avoid interactions with the other ingredients of the composition.

In the pre-treatment stage of the present process the pretreatment composition is preferably evenly applied to the textile material. Where a deeply penetrated print or a deep shade is required the pretreatment composition is preferably applied by a padding or similar process so that it is evenly distributed throughout the material. However, where only a superficial print is required the pretreatment composition can be applied to the surface of the textile material by a printing procedure, such as screen or roller printing, ink jet printing or bar application.

In the pre-treatment stage of the present process, water may be removed from the pre-treated textile material by any suitable drying procedure such as by exposure to hot air or direct heating, e.g. by infra-red radiation, or micro-wave radiation, preferably so that the temperature of the material does not exceed 100° C.

The application of the ink composition to the textile material, stage (i) of the present process, may be effected by any ink jet printing technique, whether drop on demand (DOD) or continuous flow. The ink composition, preferably also contains a humectant to inhibit evaporation of water and a preservative to inhibit the growth of fungi, bacteria and/or algae in the solution. Where the dye of Formula (1) contains a reactive group which is labile even in neutral environment, hydrolysis of the reactive group on the dye in the aqueous composition and during the fixation can be inhibited by use, as humectant, of a glycol or mixture of glycols, in which not more than one hydroxy group is a primary hydroxy group. Examples of suitable humectants are, propan-1,2-diol, butan-1,2-diol, butan-2,3-diol and butan-1,3-diol. However, the presence of small amounts, up to about 10%, preferably not more than 5%, in total, of polyols having two or more primary hydroxy and/or primary alcohols is acceptable, although the composition is preferably free from such compounds. Where the ink jet printing technique involves the charging and electrically-controlled deflection of drops the composition preferably also contains a conducting material such as an ionised salt to enhance and stabilise the charge applied to the drops. Suitable salts for this purpose are alkali metal salts of mineral acids.

After application of the ink composition, it is generally desirable to remove water from the printed textile material at relatively low temperatures (<100° C.) prior to the heat applied to fix the dye on the textile material as this has been found to minimise the diffusion of the dye from printed to non-printed regions. As with the pretreated textile material removal of water is preferably by heat, such as by exposure to hot air or to infra-red or micro-wave radiation.

In stage (ii) of the present process, the printed textile material is submitted to a short heat treatment, preferably after removal of water by low-temperature drying, at a temperature from 100° C. to 200° C. by exposure to dry or steam heat for a period of up to 20 minutes in order to effect reaction between the dye and the fibre and thereby to fix the dye on the textile material. If a steam (wet) heat treatment is used, the printed material is preferably maintained at 100°–105° C. for from 5 to 15 minutes whereas if a dry heat treatment is employed the printed material is preferably maintained at 140°–160° C. for from 2 to 8 minutes.

After allowing the textile material to cool, unfixed dye and other ingredients of the pretreatment and dye compositions may be removed from the textile material by a washing sequence, involving a series of hot and cold washes in water and aqueous detergent solutions before the textile material is dried.

According to a fourth aspect of the present invention there is provided a textile material, especially a cellulosic textile material, coloured by means of the process according to the third aspect of the present invention.

According to a fifth aspect of the present invention there is provided a toner resin composition comprising a toner resin and a dye characterised in that the dye is of Formula (1).

The toner resin is a thermoplastic resin suitable for use in the preparation of toner compositions. A preferred toner resin is a styrene or substituted styrene polymer or copolymer such as polystyrene or styrene-butadiene copolymer, especially a styrene-acrylic copolymer such as a styrene-butyl methacrylate copolymer. Other suitable toner is resins include polyesters, polyvinylacetate, polyalkenes, polyvinylchloride, polyurethanes, polyamides, silicones, epoxyresins and phenolic resins. Examples of toner resins are given in Electrophotography by R. M. Scharfert (Focal Press), U.S. Pat. No. 5,143,809, GB 2,090,008, U.S. Pat. No. 4,206,064 and U.S. Pat. No. 4,407,928.

The toner resin composition preferably contains from 0.1% to 20% of the dye of Formula (1) more preferably from 3% to 10% based on the total weight of the toner resin compositions.

The toner resin composition may be prepared by any method known to the art which typically involves mixing the toner resin with the dye of Formula (1) and optionally a charge control agent (CCA) by kneading in a ball mill above the melting point of the resin. Generally, this involves mixing the molten toner resin composition for several hours at temperatures from 120° to 200° C., in order to uniformly distribute the optional CCA and dye throughout the toner resin. The toner resin is then cooled, crushed and micronised until the mean diameter of the particles is preferably below 20 μm and, for high resolution electro-reprography, more preferably from 1 to 10 μm. The powdered toner resin composition so obtained may be used directly or may be diluted with an inert solid diluent such as fine silica by mixing for example in a suitable blending machine.

CCA's are more fully described in WO94/23344.
The invention is illustrated by the following examples:

EXAMPLE 1

Preparation of the Compound of Formula

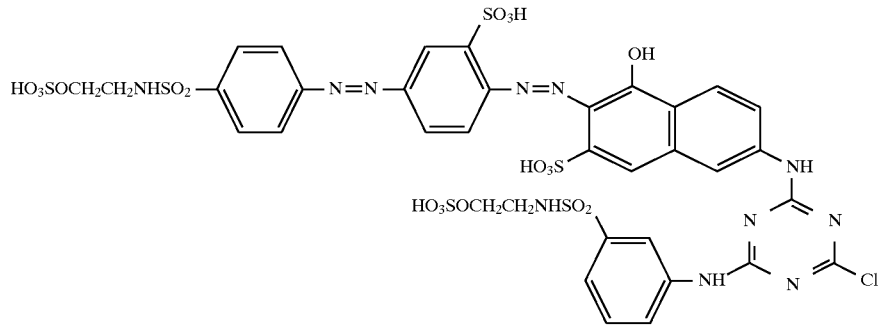

Stage a

A solution of 1-hydroxy-3-sulpho-6-amino naphthalene (5.04 g, 0.02M) in water (60cm$^3$) at pH 6.5 was added dropwise to a suspension prepared by dropwise addition of cyanuric chloride (4.06 g, 0.22M) in acetone (50cm$^3$) to ice/water (50 g). After addition the mixture was stirred at 0°–5° C. for a further 2 hours.

Stage b

To a slurry of 4-amino-1,1$^1$-azobenzene-3-sulphonic acid, 4$^1$-sulphatoethylsulphonamide (44 g, 0.02M) in ice/water (300 cm$^3$) was added concentrated hydrochloric acid (11 cm$^3$) followed by 2N NaNO$_2$ (11 cm$^3$). The mixture was stirred at 0°–5° C. until diazotisation was complete and excess nitrous acid was destroyed by adding sulphamic acid. Sodium acetate was added to give a pH of 9.4 and the mixture was added to the product of stage a. NaHCO$_3$ was added to the mixture to pH6 and the mixture was stirred at pH6, 0°–5° C. for 2 hours. KCl (15% w/v) was added and the resultant precipitate filtered off, washed and dried.

Stage c

The product from stage b (10.98 g, 7.4×10$^{-3}$ moles) was dissolved in water (200 cm$^3$). 3-(β-sulphatoethylsulphonamido)aniline (5.0 g, 0.017 mole) was added and the mixture stirred at room temperature and pH6.3 for 1 day. The solution was salted to 10% w/v with KCl and the resultant precipitate filtered-off, washed and dried to give the title product (12.1 g) having a λmax at 528 nm.

EXAMPLES 2 TO 6

Dyes of the formula:

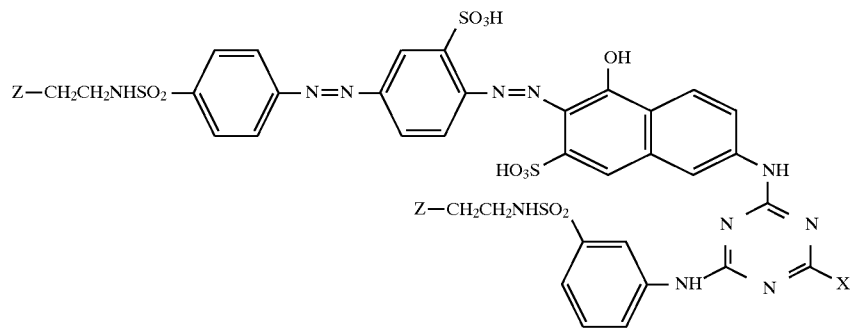

wherein Z and X are as shown in Table 1 may be made by adding the compound ZH shown in Table 1 to an alkali solution of the compound prepared in Example 1 and heating the resultant solution.

TABLE 1

| Example | Z | ZH | X |
|---|---|---|---|
| 2 | —NH($C_2H_4$OH) | 2-hydroxyethylamine | —Cl |
| 3 | —N($C_2H_4$OH)$_2$ | diethanolamine | —Cl |
| 4 | Morpholinyl | Morpholine | —Cl |
| 5 | Piperazinyl | Piperazine | —Cl |
| 6 | —NH($C_2H_4$OH) | 2-hydroxyethylamine | —NH($C_2H_4$OH) | where X is other than Cl in Table 1, greater than 3 molar equivalents of the compound ZH may be added to each mole of the compound prepared in Example 1 such that the chloro group on the triazine ring is displaced by the group X shown in Table 1.

PG=propylene glycol;

DEG=diethylene glycol;

NMP=N-methyl pyrollidone;

DMK=dimethylketone;

IPA=isopropanol;

MEOH=methanol;

2P=2-pyrollidone

MIBK=methylisobutyl ketone

CET=Cetyl ammonium bromide (a surfactant)

BAS=1:1 mixture by weight of ammonia and methylamine;

PHO=$Na_2HPO_4$.

TABLE 2

| Dye From Example No. | Dye Content | Water | PG | DEG | NMP | DMK | PHO | CET | IPA | MEOH | 2P | MIBK | BAS |
|---|---|---|---|---|---|---|---|---|---|---|---|---|---|
| 1 | 2.0 | 80 | 5 |  | 6 | 4 |  |  |  |  | 5 |  | 3 |
| 2 | 3.0 | 90 |  | 5 | 2 |  | 0.2 |  |  |  |  |  |  |
| 3 | 1.0 | 85 | 5 |  | 2 | 2 |  | 0.1 |  | 5 | 1 |  |  |
| 4 | 2.1 | 91 |  | 8 |  |  |  |  |  |  |  | 1 |  |
| 5 | 3.1 | 86 | 5 |  |  |  |  | 0.2 | 4 |  | 5 |  |  |
| 6 | 1.1 | 81 |  |  | 9 |  | 0.5 | 0.5 |  |  | 9 |  |  |
| 3 | 2.5 | 60 | 4 | 15 | 3 | 3 |  |  | 6 | 10 | 5 | 4 |  |
| 5 | 1.9 | 70 |  | 20 |  |  |  |  | 10 |  |  |  |  |
| 1 | 2.4 | 75 | 5 | 4 |  |  |  |  |  | 6 |  | 5 | 5 |
| 4 | 4.1 | 80 | 3 | 5 | 2 | 10 |  | 0.3 |  |  |  |  |  |
| 6 | 3.2 | 65 |  | 5 | 4 | 6 |  |  | 5 | 4 | 6 | 5 |  |
| 5 | 4.6 | 96 |  |  |  |  |  |  |  | 4 |  |  |  |
| 2 | 0.8 | 90 | 5 |  |  |  |  |  | 5 |  |  |  |  |
| 2 | 1.2 | 80 | 2 | 6 | 1 | 5 |  |  | 1 |  | 4 |  | 1 |
| 1 | 1.8 | 80 |  | 5 |  |  |  |  |  |  | 15 |  |  |
| 3 | 2.6 | 84 |  |  | 11 |  |  |  |  |  | 5 |  |  |
| 5 | 3.3 | 80 | 2 |  |  | 10 |  |  |  | 2 |  | 6 |  |
| 1 | 1.7 | 90 |  |  | 7 |  | 0.3 |  | 3 |  |  |  |  |
| 1 | 1.5 | 69 | 2 | 20 | 2 | 1 |  |  |  |  | 3 | 3 |  |
| 2 | 1.6 | 91 |  |  | 4 |  |  |  |  |  | 4 |  | 1 |

EXAMPLE 7

Ink jet printing inks containing dyes described in the foregoing examples may be prepared according to the following formulations shown in Table 2 wherein the figures denote parts by weight for each stated component:

The following abbreviations are used:

EXAMPLE 8

The ink compositions shown in Table 2 may be applied to a textile material such as cotton using an ink jet printer. Preferably the textile is pre-treated with a composition comprising:

2.5 parts sodium bicarbonate;
15 parts of a 10% aqueous solution of sodium alginate thickening agent;
15 parts of urea;
47.5 parts of water; and
20 parts of Composition A shown in Table 3.

TABLE 3

| Composition A | |
|---|---|
| Component | Parts by Weight |
| Urea | 25 |
| Distearyl Dimethyl Ammonium Chlorine | 2.3 |
| Isopropyl Alcohol | 0.8 |
| Castor Oil + 2.5 Ethylene Oxide | 2.2 |
| Castor Oil + 4.0 Ethylene Oxide | 0.36 |
| Sodium Lauryl Sulphate | 0.010 |
| Methanol | 0.007 |
| Formaldehyde | 0.0001 |
| Tallow Amine + 15 Ethylene Oxide | 0.25 |
| Acetic Acid (80%) | 0.05 |
| Water | 69.0 |

The textile material should be thoroughly soaked with the pre-treatment composition in a padding bath and the excess liquor removed by mangling. The material should then be dried in hot air at 100° C. prior to application of the inks shown in Table 2 by an ink jet printer.

After applying the inks, the textile may be heated at a temperature of from 100° to 200° C. to fix the dye on the material.

We claim:
1. An ink composition comprising:
   (i) a dye of Formula (1) or a salt thereof:

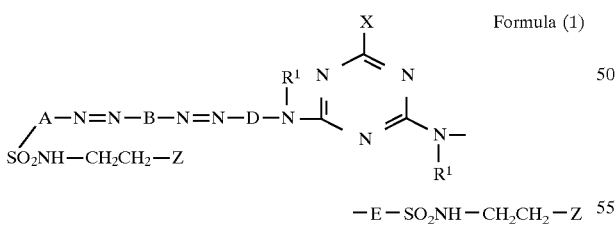

Formula (1)

wherein:
   A is optionally substituted phenylene;
   B and E each independently is optionally substituted phenylene or optionally substituted naphthylene;
   D is a coupling component;
   each $R^1$ independently is H or optionally substituted alkyl;
   X is a labile or non-labile atom or group;
   each Z independently is —$OR^3$, —$SR^3$, —$NR^4R^5$ or —Y—$SO_3H$ wherein Y is O or S; and
   $R^3$, $R^4$ and $R^5$ each independently is H, optionally substituted alkyl, optionally substituted alkenyl, cycloalkyl, optionally substituted aralkyl, optionally substituted aryl or $R^4$ or $R^5$ together with the nitrogen atom to which they are attached form a 5 or 6 membered ring; and
   (ii) a medium comprising a low melting point solid, an organic solvent or a mixture of water and one or more water-soluble organic solvent(s).

2. An ink composition according to claim 1 wherein A, B and E are optionally substituted 1,3 or 1,4-phenylene.

3. An ink composition according to either one of claims 1 or 2 wherein D is optionally substituted naphthylene.

4. An ink composition comprising a medium and a dye of Formula (2) or a salt thereof:

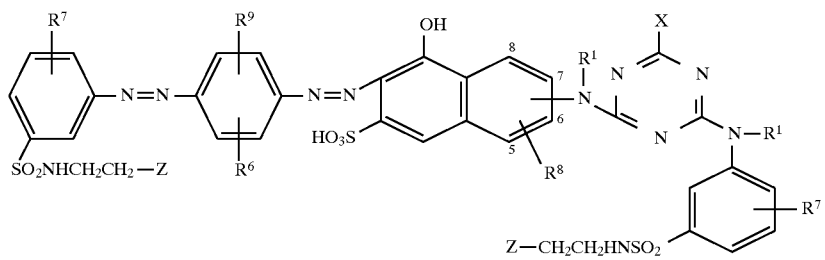

Formula (2)

wherein:
   $R^6$ and $R^9$ are each independently H, $SO_3H$, $C_{1-4}$-alkyl, $C_1$-alkoxy or halo;
   each $R^7$ independently is H, $SO_3H$, $C_{1-4}$-alkoxy, $C_{1-4}$-alkyl or halo;
   $R^8$ is H or $SO_3H$;
   each $R^1$ independently is H or optionally substituted alkyl; X is a labile or non-labile atom or group; each Z independently is —$OR^3$, —$SR^3$, —$NR^4R^5$ or —Y—$SO_3H$ wherein Y is O or S; and $R^3$, $R^4$ and $R^5$ each independently is H, optionally substituted alkyl, optionally substituted alkenyl, cycloalkyl, optionally substituted aralkyl, optionally substituted aryl or $R^4$ and $R^5$ together with the nitrogen atom to which they are attached form a 5 or 6 membered ring; and said medium comprising a low melting point solid, an organic solvent or a mixture of water and one or more water-soluble organic solvent(s).

5. An ink composition according to any one of claims 1, 2 or 4 wherein X is a labile atom or group and Z is a group of the formula —$YSO_3H$ in which Y is O or S.

6. An ink composition according to any one of claims 1, 2 or 4 wherein the medium comprises water and one or more water-soluble organic solvent(s).

7. An ink composition according to any one of claims 1, 2 or 4 comprising:

(a) 0.5 to 20 parts of the dye;

(b) 2 to 60 parts of water-soluble organic solvents; and (c) 1 to 95 parts water;

wherein all parts are parts by weight based upon the total weight of the ink and the parts (a)+(b)+(c)=100.

8. A process for printing a substrate with an ink composition comprising forming the ink into small droplets by ejection from a reservoir through a small orifice so that the droplets of ink are directed at a substrate wherein the ink composition is as defined in any one of claims 1, 2 or 4.

9. A paper, an overhead projector slide, or a textile material printed by means of the process according to claim 8.

10. A process for the coloration of a textile material with an ink composition as defined in any one of claims 1, 2 or 4 which comprises the steps:

i) applying the ink composition to the textile material by ink jet printing; and ii) heating the textile material at a temperature from 50° C. to 250° C. to fix the dye on the material.

11. A toner resin composition comprising a toner resin and a dye characterised in that the dye is as defined in any one of claims 1, 2 or 4.

* * * * *